United States Patent
Wu et al.

(10) Patent No.: US 6,207,269 B1
(45) Date of Patent: Mar. 27, 2001

(54) HIGH SUBSTRATE BIAS SPUTTERING UNDERLAYER FOR LONGITUDINAL RECORDING MEDIA

(75) Inventors: Zhong Stella Wu, Fremont; Rajiv Yadav Ranjan, San Jose, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/188,331

(22) Filed: Nov. 9, 1998

Related U.S. Application Data
(60) Provisional application No. 60/069,367, filed on Dec. 12, 1997.

(51) Int. Cl.$^7$ ............................................. G11B 5/66
(52) U.S. Cl. .................. 428/332; 428/428; 428/336; 428/694 T; 428/694 TS; 428/900; 204/192.2; 427/128; 427/129; 427/130; 427/131
(58) Field of Search ................... 428/694 T, 694 TS, 428/900, 332, 336; 204/192.2; 427/128–131

(56) References Cited

U.S. PATENT DOCUMENTS

| | | | |
|---|---|---|---|
| 5,800,931 | * 9/1998 | Lee | 428/611 |
| 5,851,628 | * 12/1998 | Ohkubo | 428/141 |
| 5,922,456 | * 7/1999 | Tonahashi | 428/332 |
| 5,968,679 | * 10/1999 | Kobayashi | 428/694 TS |
| 5,993,956 | * 11/1999 | Lambeth | 428/332 |
| 6,010,795 | * 1/2000 | Chen | 428/611 |
| 6,022,609 | * 2/2000 | Gao | 428/141 |
| 6,077,603 | * 6/2000 | Zhang | 428/332 |

* cited by examiner

*Primary Examiner*—Leszek Kiliman
(74) *Attorney, Agent, or Firm*—McDermott, Will & Emery

(57) ABSTRACT

High substrate biasing during sputter deposition of an underlayer enables the manufacture of a magnetic recording medium exhibiting increased Hr, S* and SNR. Embodiments include sputter depositing a CrMn underlayer on a NiP-plated Al substrate at a negative substrate bias greater than about 300 volts and subsequently depositing a CoCrPtTa magnetic layer.

13 Claims, 3 Drawing Sheets

Hr as a function of bias

Mrt as a function of bias.

S* as a function of bias.

SNR as a function of bias.

HIGH SUBSTRATE BIAS SPUTTERING UNDERLAYER FOR LONGITUDINAL RECORDING MEDIA

RELATED APPLICATIONS

This application claims priority from Provisional Application Serial No. 60/069,367, filed Dec. 12, 1997 entitled "HIGH SUBSTRATE BIAS SPUTTERING UNDERLAYER DESIGN FOR LONGITUDINAL RECORDING MEDIA", the entire disclosure of which is hereby incorporated herein by reference.

This application contains subject matter related to subject matter disclosed in copending U.S. patent application Ser. No. 09/188,678, filed on Nov. 10, 1998, now pending.

TECHNICAL FIELD

The present invention relates to magnetic recording media, such as thin film magnetic recording disks, and to a method of manufacturing the media. The present invention has particular applicability to high areal density magnetic recording media exhibiting low noise, high remanent coercivity and high coercivity squareness.

BACKGROUND ART

The requirements for increasingly high areal recording density impose increasingly greater demands on thin film magnetic recording media in terms of remanent coercivity (Hr), magnetic remanance (Mr), Mr times thickness (Mrt), coercivity squareness (S*), medium noise, i.e., signal-to-noise ratio (SNR), and narrow track recording performance. It is extremely difficult to produce a magnetic recording medium satisfying such demanding requirements.

The linear recording density can be increased by increasing the coercivity of the magnetic recording medium. However, this objective can only be accomplished by decreasing the medium noise, as by maintaining very fine magnetically non-coupled grains. Medium noise is a dominant factor restricting increased recording density of high density magnetic hard disk drives. Medium noise in thin films is attributed primarily to inhomogeneous grain size and intergranular exchange coupling. Accordingly, in order to increase linear density, medium noise must be minimized by suitable microstructure control.

A conventional longitudinal recording disk medium is depicted in FIG. 1 and comprises a substrate 10, typically an aluminum (Al) or an (Al)-alloy, such as an Al-magnesium (AlMg) alloy, plated with a layer of amorphous nickel-phosphorous (NiP). Alternative substrates include glass, ceramic, silicon, plastics, glass-ceramic materials, as well as graphite. There are typically sequentially sputter deposited on each side of substrate 10 an adhesion enhancement layer 11, 11', e.g., chromium (Cr) or a Cr alloy, a seedlayer 12, 12', such as NiP, an underlayer 13, 13', such as Cr or a Cr alloy, a magnetic layer 14, 14', such as a cobalt (Co)-based alloy, and a protective overcoat 15, 15', such as a carbon-containing overcoat. Typically, although not shown for illustrative convenience, a lubricant topcoat is applied on the protective overcoat 15, 15'.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is recognized that underlayers having a fine grain structure are highly desirable, particular for growing fine grains of hexagonal close packed (HCP) Co alloys deposited thereon.

As the requirements for high areal recording density escalate it becomes increasingly more important to provide high recording signals and low medium noise. Consequently, it is necessary to develop thin film structure fabrication techniques which favorably affect the microstructure, surface orientation and grain structure of the deposited films. Previously, efforts have been made to obtain suitable thin film media with advantageous magnetic performance and recording performance by varying the materials employed for the seedlayer, underlayer or buffer layer for longitudinal magnetic recording media. The epitaxial growth of a magnetic material on such layers imparts a certain crystallographic structure which results in certain magnetic properties.

Different sputtering conditions also impact the resulting magnetic proprieties, including substrate heating, varying the film thickness, and altering the re-sputtering gas and pressure. Such sputtering conditions alter the energies of the sputtered atoms and, hence, alter the growth mechanism of the films, as by thermal diffusion, crystallization and lattice matching or expansion. A substrate bias of about 100 to about 250 volts has been applied during thin film deposition. The application of a substrate bias would also increase sputtering on the grown films, further altering the surface morphology as well as crystallographic structure, thereby influencing the magnetic performance of the resulting media.

There exists a continuing need for simplified methodology enabling the fabrication of high areal recording density magnetic recording media exhibiting a high Hr, high S* and high SNR.

DISCLOSURE OF THE INVENTION

An object of the present invention is a magnetic recording medium for high areal recording density exhibiting low noise, high Hr and S*.

Another object of the present invention is a method of manufacturing a magnetic recording medium for high areal recording density exhibiting low noise, high Hr and high S*.

Additional objects, advantages and other features of the present invention will be set forth in part in the description which follows and in part will become apparent to those having ordinary skill in the art upon examination of the following only to be learned from the practice of the present invention. The objects and advantages of the present invention may be realized and obtained as particularly pointed out in the appended claims.

According to the present invention, the foregoing and other objects are achieved by a magnetic recording medium comprising a non-magnetic substrate; a chromium manganese (CrMn) underlayer on the substrate; and a magnetic layer on the underlayer.

Another aspect of the present invention is a magnetic recording medium, the method comprising: sputter depositing an underlayer on a non-magnetic substrate while applying a substrate bias greater than about 300 volts; and depositing a magnetic layer on the underlayer.

Additional objects and advantages of the present invention will become readily apparent to those having ordinary skill in the art from the following detailed description, wherein the embodiments of the present invention are described, simply by way of the best mode contemplated for carrying out the present invention. As will be realized, the present invention is capable of other and different embodiments, and its several details are capable of modifications in various other respects without departing from the present invention. Accordingly, the drawings and description are to be regarded as illustrative in nature and not as restrictive.

DESCRIPTION OF THE INVENTION

The present invention provides methodology and resulting magnetic recording media for high areal density longitudinal recording, which media exhibit a high Hr, high S*, and significantly improved SNR. These results are achieved, in part, by strategically applying a high substrate bias during sputter deposition of the underlayer, such as a substrate bias not less than about 300 volts. Suitable substrate bias voltages include about 300 volts to about 1000 volts, such as about 300 volts to about 500 volts, e.g., about 300 volts to about 400 volts.

Particularly advantageous results have been achieved employing a chromium manganese (CrMn) underlayer containing about 0.1 to about 50 at. % Mn, e.g. about 10 to about 25 at. % Mn. The underlayer can be deposited at a suitable thickness, as between about 10 Å to about 1000 Å, e.g. about 100 Å to about 600 Å.

The present invention is applicable to magnetic recording media containing substrates, underlayers, magnetic layers, and other layers conventionally employed in the manufacture of magnetic recording media. For example, suitable substrates include NiP plated Al or Al alloys, or glass, ceramic or glass ceramic materials. Magnetic layers can comprise any conventional magnetic layer, such as Co alloys, e.g. alloys of Co with Cr, platinum (Pt) and Ta. Other suitable magnetic alloy systems include CoCrTa and CoCrPt.

Figure 1:
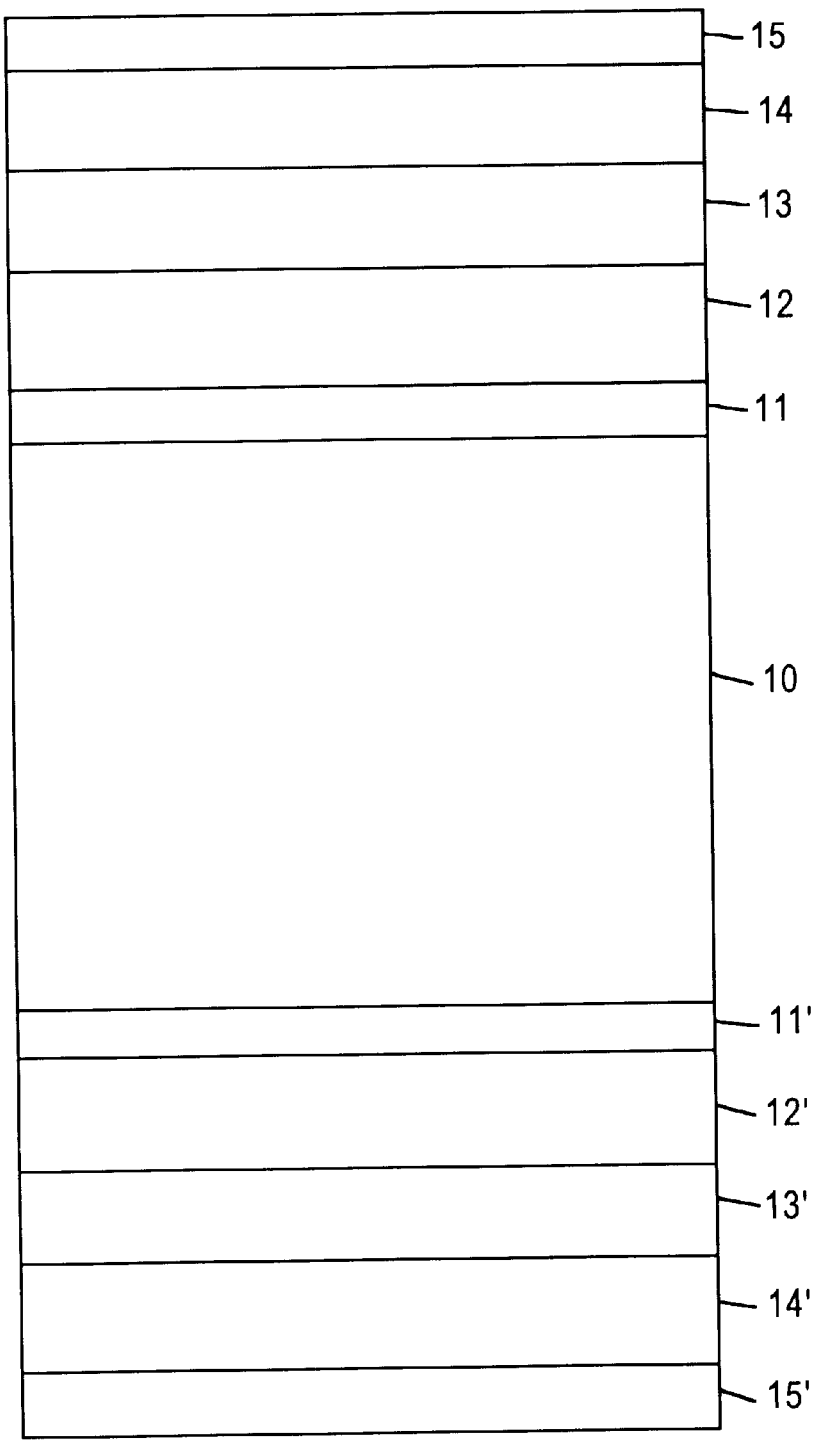
FIG. 1 schematically illustrates a conventional magnetic recording medium.

Underlayers for use in embodiments of the present invention include any of those conventionally employed in the manufacture of magnetic recording media, such as Cr and Cr alloys. Embodiments of the present invention include the type of magnetic recording medium depicted in FIG. 1, including a lubricant topcoat.

Conventionally, underlayers are deposited either without applying a substrate bias or by applying a relatively low substrate bias of about 100 to about 250 volts. However, after extensive experimentation and investigation, it was found that the application of a high substrate bias during sputter deposition of an underlayer, e.g. a CrMn underlayer, resulted in a magnetic recording medium exhibiting greatly improved Hr, S* and SNR vis-a-vis a magnetic recording media wherein the underlayer was deposited without or at a relatively low substrate bias. Thus, the present invention provides methodology and resulting magnetic recording media for high areal recording density exhibiting superior magnetic reading/writing performance.

EXAMPLES

Five groups of magnetic recording media samples were manufactured, each group containing two samples sputtered with similar Mrt. Each sample contained substantially the same structure and was manufactured under substantially the same conditions, except that the substrate bias was varied during sputtering of the CrMn underlayer from −100 to −400 volts in −50 volt intervals. Each sample comprised a $Cr_{0.8}Mn_{0.2}$ underlayer, a CoCrPtTa, magnetic layer epitaxially grown thereon, and a NiP-plated Al substrate having a mechanical texture with an average surface roughness (Ra) of 6 Å. Sputtering was conducted in a DC magnatron sputtering apparatus with a base pressure of about $10^{-7}$ Torr. The substrate was preheated to about 250° C., and the sputtering pressure was maintained in a range of about 5 to about 15 mTorr.

The magnetic properties of the samples were tested on a non-destructive rotating disk magnetometer. The recording signal and media noise was measured at 240 kfci (kiloflux reversal per inch) linear density employing a Guzik tester with an MR (magnetoresistive) head having a gap length of about 0.54 $\mu$m flying at a height of about 1.1 $\mu$ inch.

The results are reported in FIGS. 2A–2D, showing the Hr, Mrt, S* and SNR, respectively, for the two samples within each group. The results for two samples wherein the underlayer was sputter deposited at a bias voltage of −400 volts vis-a-vis at −100 volts are shown in Table I below.

TABLE I

| Bias voltage (V) | Hr (Oe) | Mrt (memu/cm$^2$) | S* | SNR (dB) |
| --- | --- | --- | --- | --- |
| 400 | 3142 | 0.76 | 0.9 | 24.8 |
| 100 | 2551 | 0.75 | 0.85 | 22.8 |

Figure 2A:
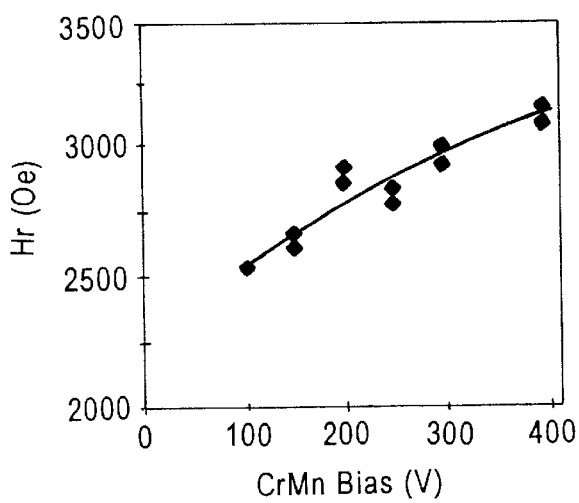
FIGS. 2A–2D illustrate the Hr, Mrt, S* and SNR, respectively, as a function of substrate bias.
Figure 2B:
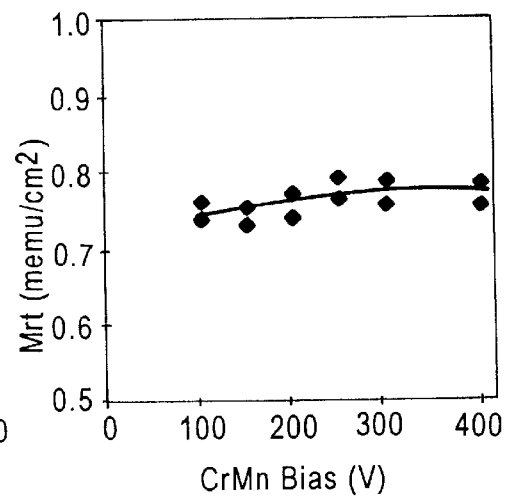
Figure 2C:
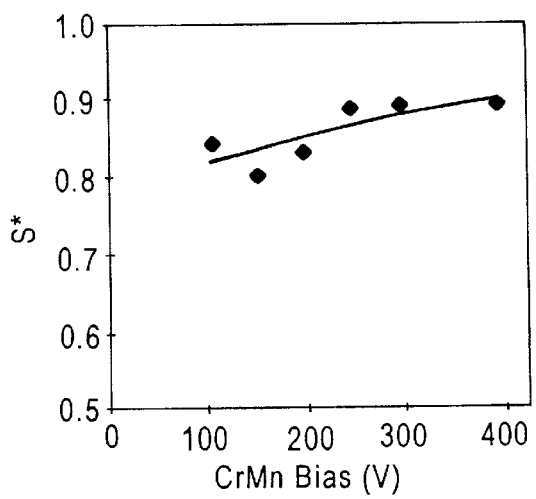
Figure 2D:
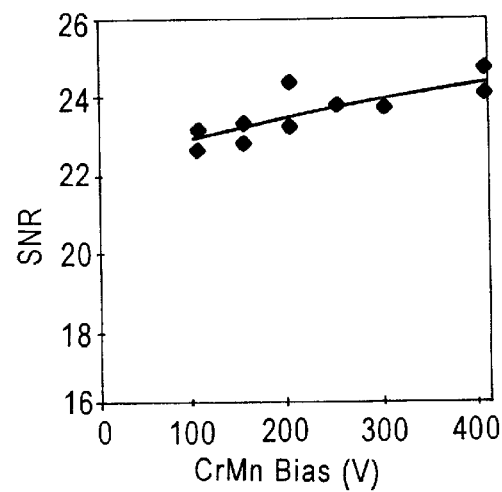

It should be apparent from FIG. 2A that the Hr increases significantly when the absolute value of substrate bias is increased from 100 volts to 400 volts, i.e. an increase of 600 Oe. FIG. 2B illustrates that the Mrt value is relatively consistent with a slight increasing trend with increasing substrate bias. As shown in FIG. 2C, S* increases significantly with increasing substrate bias, i.e., from 0.8 to 0.9. As shown in FIG. 2D, SNR increases linearly as well with increasing substrate bias.

It is, therefore apparent from FIGS. 2A–2D that the application of a high substrate bias while sputtering the underlayer achieves a film structure with stronger in-plane anisotropy and low media noise. It is not believed that the strong dependence of magnetic performance on substrate bias during underlayer deposition was previously appreciated.

The specific mechanism involved in achieving improved magnetic performance by imposing a high substrate bias during sputter deposition of the underlayer is not known with certainty. However, it is believed that the application of a high substrate bias during sputter deposition of the underlayer affects the film growth and crystallographic structure in a significant manner. It is believed that the high substrate bias voltage influences alignment and film orientation which results in a higher in-plane anisotropy, higher Hr and higher S*.

Figure 3:
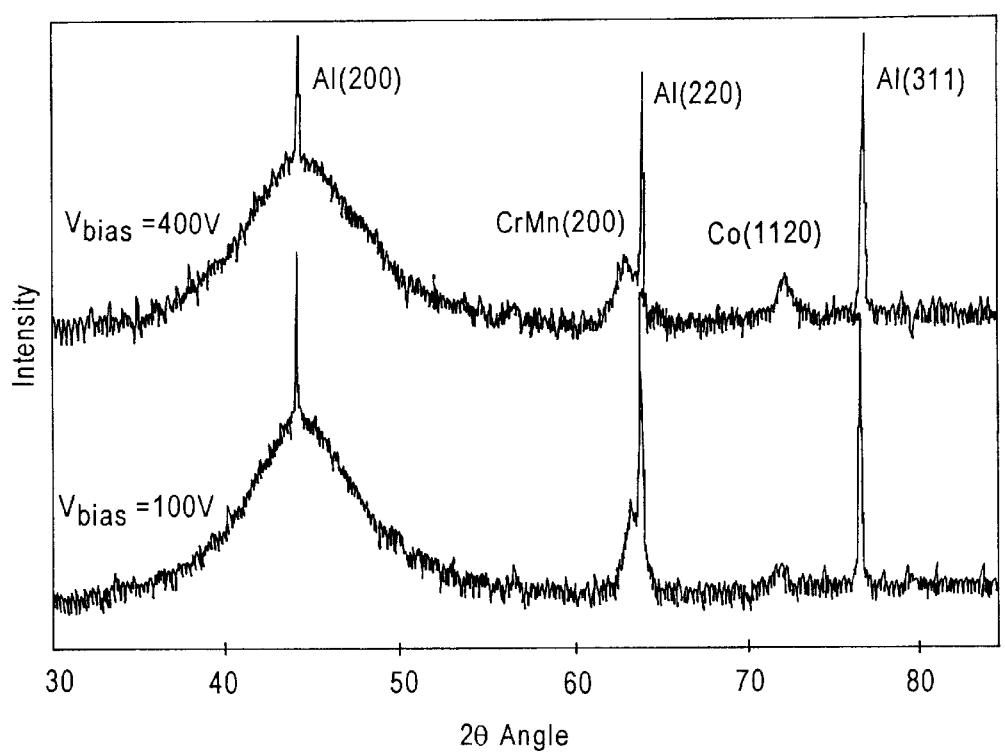
FIG. 3 is an x-ray diffraction scan for two samples sputtered at different substrate bias voltages.

In an effort to understand the link between the application of a high bias voltage during sputtering of the underlayer and the magnetic performance of the resulting magnetic recording medium, an x-ray diffraction scan study was performed. The results are reported in FIG. 3 for two samples. The x-axis is 2θ, while the y-axis is x-ray diffraction intensity in an arbitrary unit. The top curve was shifted upwardly for comparison. The top sample was sputtered at a −400 volts substrate bias during CrMn growth, while the bottom sample was sputtered at a −100 volt substrate bias during sputter deposition of the CrMn underlayer. The CrMn (200) peak would exhibit a significantly stronger intensity when a −400 volt substrate bias was applied, while the small shift to the lower 2θ angle indicates a small lattice expansion along the perpendicular direction. The intensity for the Co (1120) peak was also higher for the sample wherein the underlayer was sputter deposited with a 400 volt substrate bias than for the sample wherein the underlayer was sputter deposited at a lower substrate bias. Both phenomena indicate that for high substrate bias sputtering of the underlayer, the underlayer film is more oriented in the (200) plane, exhibits a relaxed crystallographic lattice which is better matched with the CoCrPtTa magnetic layer. Consequently, better orientation of the CoCrPtTa in the (11$\bar{2}$0) plane with more grains having magnetic easy axis in the film plane was achieved. Such results would explain the improvement in Hr, S* and SNR reported in Table I.

The present invention, therefore, involves the strategic use of a high substrate bias during sputter deposition of an underlayer in order to improve magnetic performance of the resulting magnetic recording media for high density longitudinal recording. The present invention can be employed to produce any of various types of magnetic recording media, including thin film disks. The present invention is particularly applicable in producing high areal recording density magnetic recording media requiring a low flying height.

Only certain embodiments of the present invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A magnetic recording medium comprising:
   an on-magnetic substrate;
   a chromium manganese (CrMn) underlayer on the substrate; and
   a magnetic layer, comprising an alloy of cobalt-chromium-platinum-tantalum, on the underlayer, wherein the magnetic layer has a (11$\bar{2}$0)-dominant crystallographic orientation, the CrMn underlayer has a (200)-dominant crystallographic orientation and the magnetic recording medium has a:
   Hr greater than about 3000 Oersteds;
   S* greater than about 0.85; and
   SNR greater than about 24 dB @240 kfci.

2. The magnetic recording medium according to claim 1, wherein the CrMn underlayer contains about 0.1 to about 50 at. % Mn.

3. The magnetic recording medium according to claim 2, wherein the CrMn underlayer contains about 10 to about 25 at. % Mn.

4. The magnetic recording medium according to claim 1, wherein the underlayer has a thickness of about 10 Å to about 1000 Å.

5. The magnetic recording medium according to claim 4, wherein the underlayer has a thickness of about 100 Å to about 600 Å.

6. The magnetic recording medium according to claim 1, wherein the substrate comprises a nickel phosphorous-plated aluminum or aluminum alloy substrate.

7. The magnetic recording medium according to claim 1, wherein the CrMn underlayer was sputter deposited at a substrate bias with an absolute value greater than about −300 volts.

8. A method of manufacturing a magnetic recording medium, the method comprising:
   sputter depositing a chromium manganese (CrMn) underlayer on a non-magnetic substrate while applying a negative substrate bias greater than about 300 volts; and
   depositing a magnetic layer, containing a cobalt-chromium-platinum-tantalum alloy, on the underlayer, wherein the magnetic layer has a (11$\bar{2}$0)-dominant crystallographic orientation, the CrMn underlayer has a (200)-dominant crystallographic orientation and the magnetic recording medium has a:
   Hr greater than about 3000 Oersteds;
   S* greater than about 0.85; and
   SNR greater than about 24 dB @240 kfci.

9. The method according to claim 8, comprising depositing the underlayer on the non-magnetic substrate at a substrate bias between about −300 volts and about −1000 volts.

10. The method according to claim 9, comprising sputter depositing the CrMn underlayer at a substrate bias between about −300 volts and about −500 volts.

11. The method according to claim 10, comprising sputter depositing the CrMn underlayer at a substrate bias between about −300 volts and about −400 volts.

12. The method according to claim 9, wherein the CrMn underlayer contains about 0.1 to about 50 at. % manganese.

13. The method according to claim 12, wherein the CrMn underlayer contains about 10 to about 25 at. % manganese.

\* \* \* \* \*